United States Patent Office 2,715,934
Patented Aug. 23, 1955

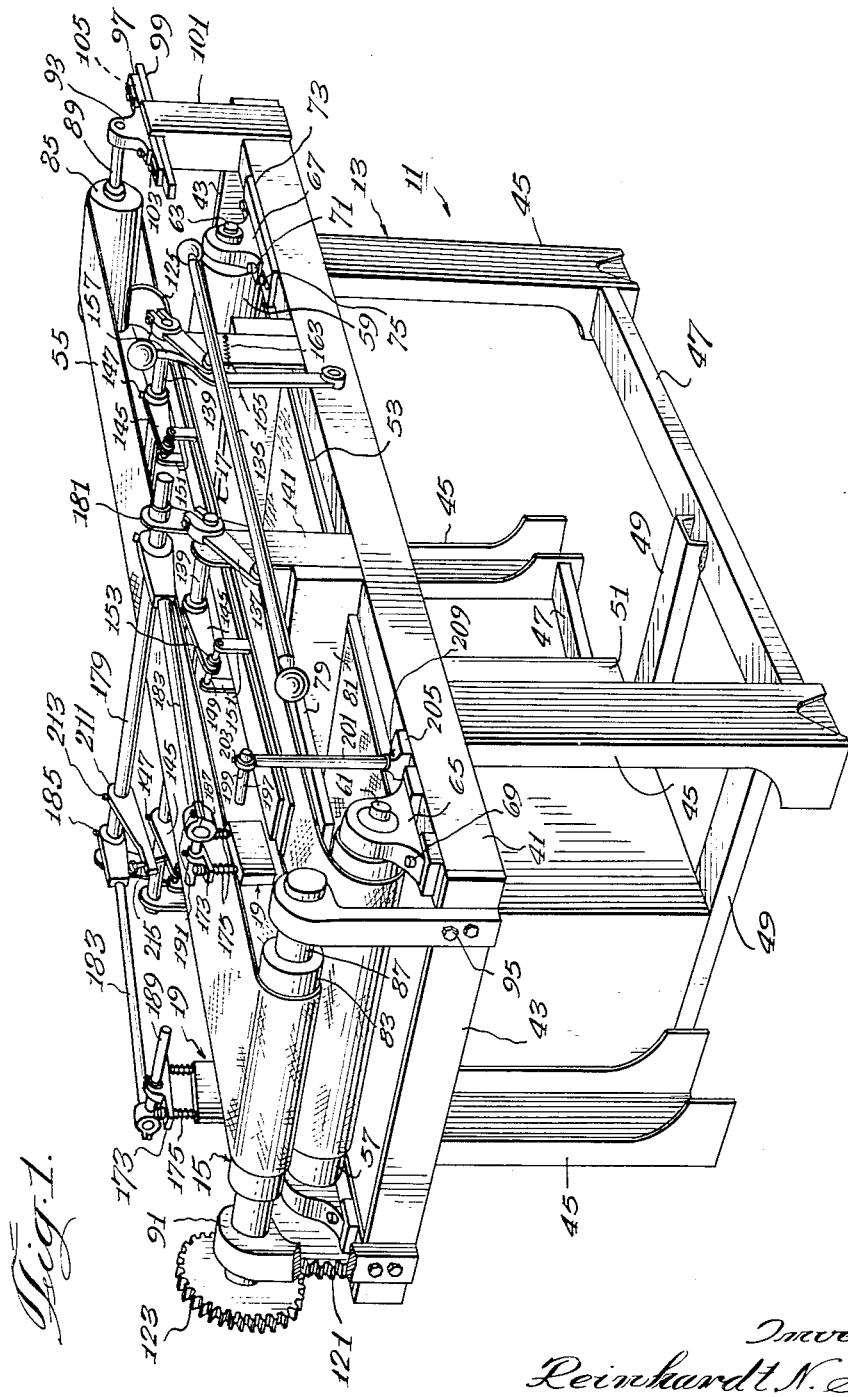

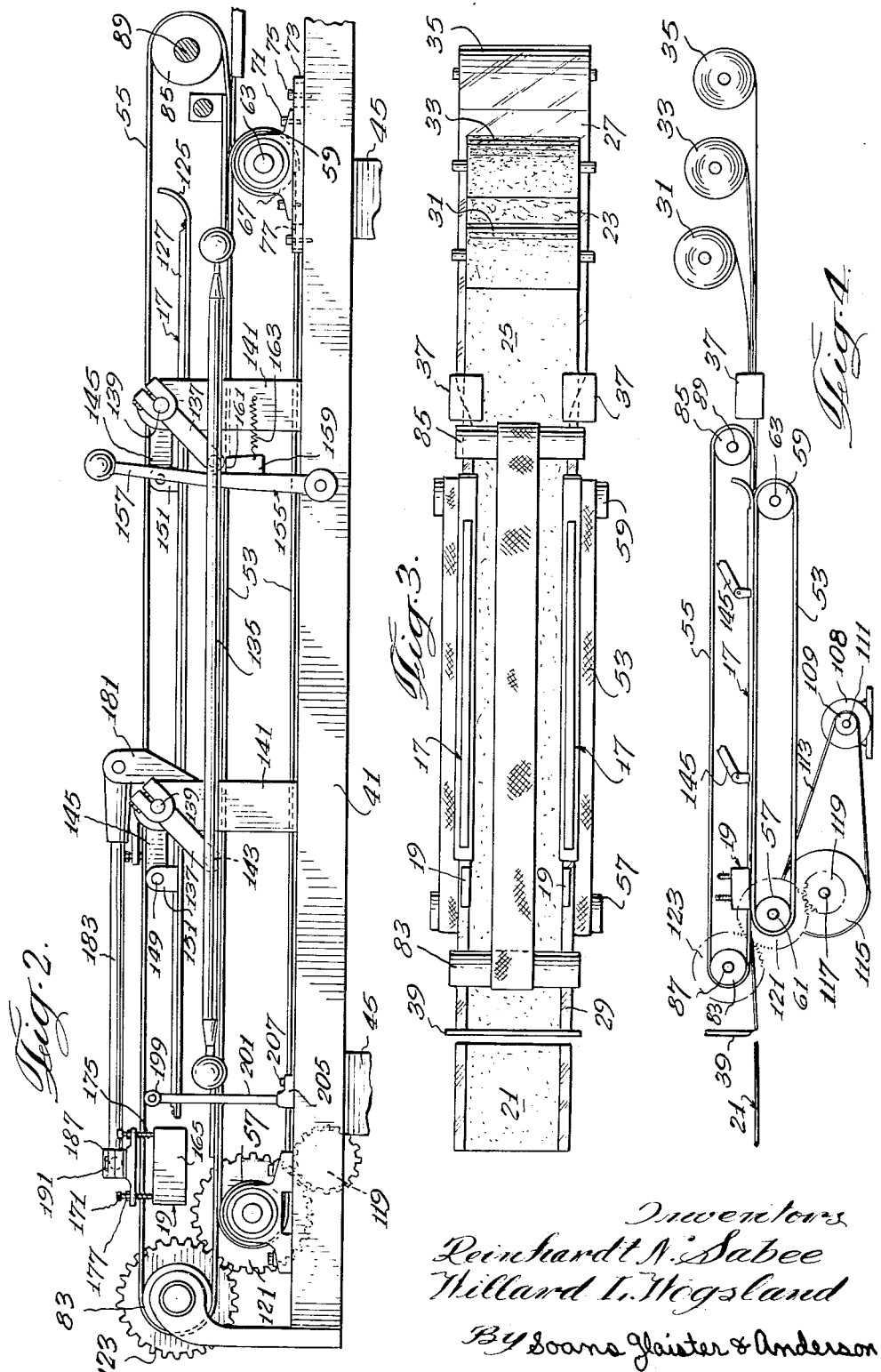

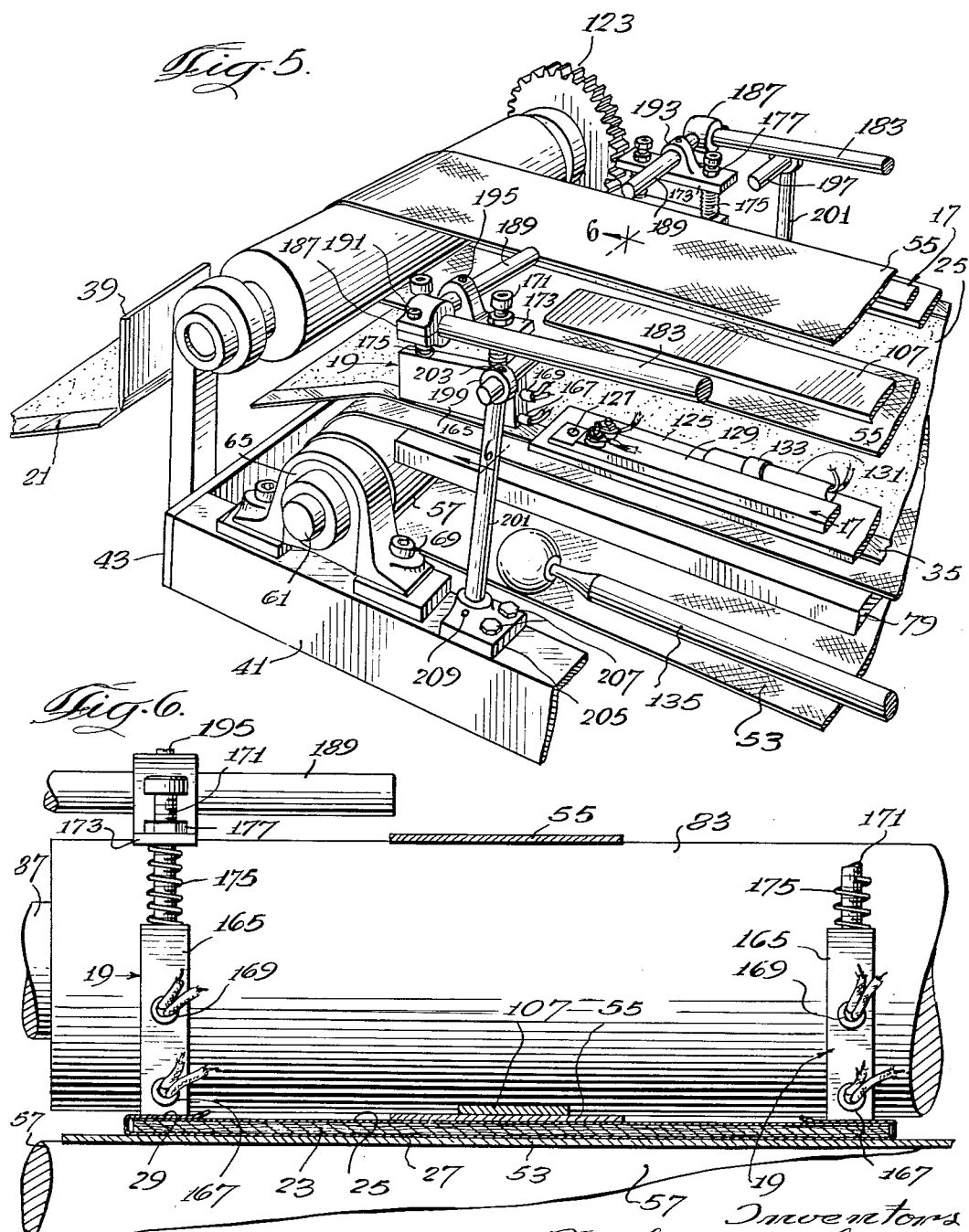

2,715,934

HEAT SEALING APPARATUS

Reinhardt N. Sabee, Appleton, and Willard L. Wogsland, Neenah, Wis.; said Wogsland assignor to said Sabee Application April 2, 1953, Serial No. 346,318

12 Claims. (Cl. 154—42)

The present invention relates to heat sealing equipment and more particularly to an apparatus for heat sealing thermoplastic webs.

Many products which are in common use are formed with or enclosed in thermoplastic sheets or webs and portions of such thermoplastic webs are often joined either to an overlying or to an underlying web by means such as heat sealing. A thermoplastic web may be heat sealed to an adjacent web layer by raising the thermoplastic web to a temperature sufficient to cause the thermoplastic material to soften and then applying enough pressure while it is in such softened condition to cause the thermoplastic web to adhesively join to the adjacent web layer. Various forms of heat sealing apparatus have been designed for heat sealing adjacent web layers in particular products.

Although the existing heat sealing apparatus are reasonably satisfactory for joining together a thermoplastic web with an adjacent web layer under certain conditions, such apparatus are generally not adaptable for producing a satisfactory heat seal when the webs to be sealed are drawn continuously through the heat sealing apparatus at high speeds and/or when the webs to be sealed enclose a body of material which is of variable thickness.

In the usual heat sealing apparatus, the webs to be sealed are heated by a plate which extends a substantial distance along the direction of movement of the webs through the apparatus. If the thickness of the web product being formed is not uniform, the amount of web surface contacted by the heated plate will vary as the webs to be sealed are drawn through the apparatus. Under such conditions, even when the webs are drawn slowly through the heat sealing apparatus, the heat sealing apparatus will generally either fail to seal portions of the overlapping web layers or will overheat portions of the web layers to such an extent as to partially melt the webs in certain regions.

The objects of the present invention are to provide a heat sealing apparatus which can join a web of thermoplastic material to an adjacent web layer; to provide a heat sealing apparatus which is able to seal a thermoplastic web to an adjacent web layer as the webs move at high speed continuously through the apparatus; to provide a heat sealing apparatus which is capable of sealing a web of thermoplastic material to an adjacent web layer when the webs enclose a body of material which may be of variable thickness; to provide a heat sealing apparatus which is adjustable for use with varying products of varying dimensions; and to provide such a heat sealing apparatus which is of a simple, economical construction.

Further objects and advantages of the present invention will become apparent from the following description and accompanying drawings of one embodiment of the invention.

In the drawings:

Figure 1 is a perspective view of a heat sealing apparatus constructed in accordance with the present invention, the heating members being shown in raised position;

Figure 2 is a side elevational view of the heat sealing apparatus illustrated in Figure 1, the heating members being shown in raised position;

Figure 3 is a diagrammatic plan view of an apparatus for producing absorbent pads, said apparatus incorporating the heat sealing apparatus illustrated in Figures 1 and 2;

Figure 4 is a diagrammatic side elevational view of the apparatus shown in Figure 3;

Figure 5 is a partial perspective view of the forward end of the heat sealing apparatus illustrated in Figure 1, the heat sealing members being shown in lowered or sealing position; and Figure 6 is a partial sectional view of the heat sealing apparatus taken along line 6—6 of Figure 5.

A heat sealing apparatus 11 constructed in accordance with the present invention generally includes a frame 13 for supporting the various elements of the apparatus, a means such as a conveyor mechanism 15 for supporting and carrying a product which includes a thermoplastic web portion which is to be heat sealed through the apparatus 11, a first relatively long heating member 17 which is adapted to contact the surface of the product as it is carried through the apparatus so as to heat the thermoplastic web portion to be sealed to a temperature sufficient to cause the thermoplastic material to become tacky, and a second relatively short heating member 19 positioned forwardly of and in line with the first heating member which is adapted to contact the heated surface portion of the product at a pressure and temperature such that it causes the underlying thermoplastic web to adhesively join to an adjacent web layer.

The heat sealing apparatus illustrated in the drawings is particularly designed for use in the manufacture of a disposable absorbent pad. It should be understood, however, that the apparatus is applicable with only slight modifications for heat sealing various other types of products.

One form of absorbent pad 21 is shown in Figures 3, 4, and 6. This pad 21 includes a filling of absorbent material 23 of selected thickness, a cover sheet 25 of a pervious material which is substantially co-extensive in width with the filler material 23, and a substantially moisture-proof, flexible protective backing sheet 27 which has a continuous thermoplastic coating on at least one side thereof. The protective backing sheet 27 has marginal portions 29 which are folded over the absorbent filler material 23 and cover sheet 25. The folded over portions 29 of the protective backing sheet 27 are heat sealed to the upper surface of the cover sheet 25 to secure the cover sheet 25, filler material 23, and protective backing sheet 27 in assembled relation.

One means for properly assembling the elements of the disposable pad 21 in their proper relationship prior to their entrance into the heat sealing apparatus 11 is diagrammatically illustrated in Figures 3 and 4. As illustrated in these drawings, the cover sheet 25, absorbent filler material 23 and protective backing sheet 27 are drawn from supply reels 31, 33, and 35 respectively.

Although the webs might be drawn from the supply reels in various manners, they are shown as being drawn by the conveyor mechanism 15 which forms a portion of the heat sealing apparatus 11. As illustrated particularly in Figure 3, the supply reel 35 for the backing sheet is somewhat wider than the supply reels 33 and 31 for the filler material 23 and cover sheet 25. Appropriately shaped forming dies 37 positioned between the conveyor mechanism 15 and the supply reels engage the side margins of the backing sheet 27 and fold these margins over the upper surface of the cover sheet 25 as illustrated in Figure 3. The assembled web product then moves through the heat sealing apparatus 11 where the folded over portions 29 of the protective backing sheet 27 are heat sealed to the upper surface of the cover sheet 25. After the assembled web product leaves the heat sealing apparatus 11, it passes a cutting mechanism 39 where the web product is cut at spaced intervals so as to form individual absorbent pads 21.

The frame 13 for the heat sealing apparatus 11 is particularly shown in Figures 1, 2, and 5 of the drawings. The frame includes two spaced apart, longitudinally extending, parallel channel members 41 which are interconnected by transverse plates 43. The channel members 41 are connected to and supported by legs 45. Plate members 47 extend longitudinally between and connect with the lower end of the legs 45. The plate members 47 support a pair of transverse channel members 49 which provide a support for a housing 51.

The conveyor mechanism 15 for the heat sealing apparatus 11 comprises a pair of endless conveyor belts 53 and 55 which are arranged one above the other so that the web product will be engaged and carried between the upper reach of the lower endless conveyor belt 53 and the lower reach of the upper endless conveyor belt 55. The lower endless conveyor belt 53 is supported by a pair of rollers 57 and 59 which are affixed to the shafts 61 and 63, the shafts 61 and 63 being rotatable in bearings 65 and 67, respectively. The forward bearings 65 are fixedly supported on the frame members 41 by bolts 69. The rearwardly positioned bearings 67 are fixedly positioned by bolts 71 on plate members 73 which are adjustably mounted on the frame members 41 by bolts 75 which extend through slots 77 in the plates 73 and thread into the frame members 41. The endless belt 53 can be loosened or made more taut by loosening the bolts 75 and then adjusting the plate members 73 and bearings 67 either forwardly or rearwardly as required.

A pair of horizontal supporting plates 79 are positioned below the side margins of the upper reach of the lower endless belt 53 to prevent these portions of the belt from bowing when they are under pressure from the weight of the heating members 17. The plates 79 are attached to transverse supporting members 81 which are fixed to the frame members 41.

The upper endless belt 55 is supported by a pair of rollers 83 and 85 which are affixed to the shafts 87 and 89, the shafts 87 and 89 being rotatable in the bearings 91 and 93, respectively. The forward bearings 91 are connected to the forward plate member 43 of the frame 11 by bolts 95 and the rearward bearings 93 are attached to plates 97 which are adjustable on plate members 99, the plate members 99 being affixed to supports 101 which are welded to the frame members 41. The plates 97 are adjustably positioned on the plate members 99 by means of bolts 103 which extend through slots 105 in the plate 97 and thread into the plate members 99. The upper continuous belt 55 is somewhat narrower than the lower continuous belt 53 so as to overlie only the central portion of the lower continuous belt 53. A fixed plate 107 may be positioned adjacent the upper surface of the lower reach of the upper conveyor belt 55 by a suitable support (not shown) so as to prevent the belt 55 from bowing upwards when the web product is being carried between the conveyor belts 53 and 55. Although it is not shown in the illustrated embodiment, the shaft 87 which supports the roller 83 could be supported in vertically movable bearings which are biased in a downward direction to thereby maintain a more uniform pressure on a product of variable thickness.

A drive motor 108 supported within the housing 51 provides the power for turning the conveyor belts 53 and 55. As illustrated in Figure 4, a pulley 109 on the shaft 111 of the motor 108 engages an endless V-belt 113. The belt 113 also extends around a pulley 115 on a shaft 117. A gear 119 on the shaft 117 meshes with a gear 121 on the roller shaft 61, thereby causing the lower conveyor belt 53 to move whenever the motor 107 is operating. The gear 121 also meshes with a gear 123 on the shaft 87 which supports the roller 83 thereby causing the conveyor belts 53 and 55 to operate simultaneously.

As seen in Figures 1, 3, and 5, the illustrated heat sealing mechanism 11 includes a pair of spaced heating members 17 which are adapted to be raised and lowered relative to the upper reach of the lower conveyor belt 53. The heating members 17 are positioned directly above the supporting plates 79. Each of the heating members 17 includes an elongated, longitudinally extending, ski-shaped plate 125 formed of stainless steel or other heat conductive metal, one or more electric heating elements 127 mounted on the plates 125 by screws 129, and a thermostat 131. The thermostats 131 are mounted on the plates 125 by ring clamps 133 and connect to switches (not shown) which control the current to the heating elements 127 so as to maintain the heating members 17 at a constant temperature.

The heating members 17 may be simultaneously raised and lowered by shifting a control rod 135 forwardly or rearwardly. Parallel links 137 connect the rod 135 with a pair of spaced transverse shafts 139, the shafts 139 being rotatably supported in side plates 141 which are attached by means such as welding to the channel members 41. The links 137 are rotatably connected at their lower ends to the control rod 135 by studs 143 and fixedly connected at their upper ends to outwardly extending end portions of the shafts 139 whereby the lateral shifting of the control rod 135 rotates the shafts 139. A pair of spaced parallel links 145 connect each shaft with one end of each of the heating members 17. The links 145 are fixedly connected at their upper ends to the shaft 139 by set screws 147 and rotatably support transverse pins 149 at their lower ends. The pins 149 engage brackets 151 which extend upwardly from the plates 125. The pins 149 are threaded and have positioning nuts 153 thereon for adjusting the pins 149 relative to the links 145.

Normally, the weight of the heating members 17, rotates the shafts 139 counterclockwise as viewed in Figures 1 and 2, thereby causing the control rod 135 to be in a rearward and lowered position. When the control rod 135 is pulled forwardly, it will also move in an upward direction since the links 137 which connect to the rod 135 will pivot about the shafts 139. This will cause the links 145 to pivot in clockwise direction and raise the heating members 17. A locking mechanism 155 is provided for maintaining the heating members 17 in raised position. The locking mechanism 155 includes an offset locking lever 157 which is pivoted at its lower end to the frame 41. The lever 157 has a rearwardly extending boss 159 which provides a shoulder 161 for engaging the lower end of one of the links 137 when the locking lever 157 is in locking position. A spring 163 which extends between the boss 159 of the locking lever 157 and the adjacent side plate 141 biases the locking lever 157 toward the side plate 141 for maintaining the locking lever 157 in locking position. When the heating elements are in lowered position, the bottom end of the locking link 137 will engage the rearward face of the boss which, as shown in Figure 2, is inclined slightly rearwardly. As the rod 135 is moved forwardly and upwardly, the bottom of the locking link 137 will ride upwardly along the inclined rearward face of the boss 159 until it passes the upper edge of the boss 159 and seats on the shoulder 161. The spring 163 will maintain the locking lever 157 in locking position until the upper end of the lever 157 is manually moved in a forward direction so as to release the lower end of the locking link 137 from the shoulder 161 of the boss 159.

In order to obtain as good heat transfer as is possible between the heating members 17 and the product to be sealed, the heating members 17 should exert as large a pressure as possible on the product to be sealed without distorting or affecting the movement of the product through the apparatus. The pressure exerted by the heating members 17 can be easily altered by adding weights (not shown) to the upper surface thereof or by the addition of a suitable counterbalancing means (not shown).

A heating member 19 is positioned immediately forwardly of and in line with each of the heating members 17. Each of the heating members 19 includes a rectangular block 165 of stainless steel or other conductive metal, a heating element 167, and a thermostat 169, the heating element 167 and the thermostat 169 seating in recesses in the block 165. The thermostats 169 are connected to switches (not shown) which control the current to the heating elements 167 so as to maintain the heating members 19 at a constant temperature. The blocks 165 are suspended by bolts 171 from plate members 173. The blocks 165 are biased downwardly away from the plate members 173 by springs 175 which extend around the bolts 171. Nuts 177 are provided on the bolts 171 for adjusting the tension on the springs 175.

The heating members 19 are adjustably mounted for movement about the axis of a transverse shaft 179. The shaft 179 is rotatably supported in brackets 181 which are connected by means such as welding to the forwardly positioned side plates 141. A pair of parallel longitudinally extending links 183 are adjustably attached at their rearward end to the shaft 179 by set screws 185 for rotation therewith. Split sleeves 187 having transverse shafts 189 extending therefrom are adjustably connected to the forward ends of the links 183 by set screws 191. Each of the plate members 173 is provided with a centrally located boss 193 on its upper surface. The shafts 189 extend transversely through the bosses 193, the bosses being adjustably fixed in position along the shafts 189 by set screws 195.

As illustrated in Figures 1, 2, and 5, vertically adjustable transverse rods 197 extend inwardly from the sides of the frame 11 for limiting the counterclockwise rotation of the links 183 and thereby provide a means for controlling the force with which the heating members 19 engage the upper reach of the lower conveyor belt 53 or a product carried thereon. Each of the rods 197 extends through a collar 199 on the upper end of a support rod 201 and are adjustably positioned therein by a set screw 203. The support rods extend through base members 205 attached by bolts 207 to the frame members 41 and are adjustably positioned therein by the set screws 209.

A longitudinally extending link 211 which is adjustably connected to the shaft 179 by a set screw 213 has an adjusting bolt 215 extending through its outer end which is adapted to be engaged by one of the forward links 145 when the links 145 are rotated in a clockwise direction by the forward movement of the control rod 135. After the adjusting bolt 215 is engaged by the link 145, further clockwise rotation of the links 145 will produce a corresponding clockwise rotation of the link 211 and shaft 179, and since the heating members 19 are connected through the links 183 to the shaft 179, the clockwise rotation of the shaft 179 will cause the heating members 19 to rotate in a clockwise direction around the shaft 179. The forward movement control rod 135 will therefore raise both the heating members 17 and the heating members 19.

The pressure exerted by the heating members 19 on the product being sealed should be sufficiently high to cause the heated webs to adhesively joint together without distortion thereof. As seen in Figure 5, the heating members 19 are positioned so that only the forward ends of the heating members contact the product being sealed. Since the pressure of the heating members 19 on the product would ordinarily be too large, the support rods 201 are positioned so that when the links 183 rest on the rods 197, the heating members 19 contact the product with the desired sealing force. The manner in which the heating members 17 and 19 are attached to the frame permits them to move vertically, relative to the product being heat sealed when the relative thickness of the product changes, thus avoiding any serious pressure changes between the heating members 17 and 19 and the product.

The temperatures of the heating members are determined by the type of webs which are to be heat sealed. The heating members 17 are generally maintained at a temperature sufficient to heat the thermoplastic web portions which are to be heat sealed to a tacky condition during the period of time the web product remains in contact with the members 17 and the heating members 19 are maintained at a temperature sufficient to maintain the heated web portions at or bring such heated web portions to heat sealing temperature while they are subjected to the pressure of the heating members 19.

To operate the heat sealing mechanism, the product to be heat sealed is adjusted for movement between the conveyor belts 53 and 55. The heating members 17 and 19 are adjusted laterally so as to be centered over the portions of the product to be sealed when the product is drawn through the heat sealing apparatus 11. The support rods 201 are adjusted vertically so that when the heating members 19 are lowered, they will engage the product with the required pressure. When the heating members 17 and 19 are in raised position, that is, with the control rod 135 in its forward locked position, the heating members are brought to their operating temperatures. The motor 107 is started which causes the conveyor mechanism 15 to operate, thereby drawing the product to be sealed continuously through the heat sealing apparatus 11. The locking lever 157 is then moved forwardly, thereby unlocking the control rod 135. The control rod is moved rearwardly, thereby causing both the heating members 17 and the heating members 19 to move into engagement with the product which is to be sealed. The heating members 17 are lowered until they rest on the product which is to be sealed. Since the heating members 17 contact the product over a considerable distance, local areas of the product which pass beneath the heating members 17 without coming into direct contact with the heating members 17 will be heated by convection and by conduction during its passage beneath the heating members 17. The portions of the product which are heated by the members 17 are immediately thereafter drawn into contact with the heating members 19. Although the length of time that the heating members 19 are in contact with the heated web portions is brief, it is sufficient to produce an effective heat seal along the product.

It should be understood that the exact design of the means for carrying the product to be sealed through the apparatus as well as the dimensions and location of the heating members of the described apparatus will vary in accordance with the product which is to be heat sealed.

Other variations and arrangements in the apparatus will suggest themselves to those skilled in the art. Various features of the invention believed to be new are expressly set forth in the appended claims.

We claim:

1. Apparatus for heat sealing thermoplastic webs comprising a frame, means on said frame for supporting and carrying thermoplastic web products through the apparatus, an elongated heating member supported on said frame for movement into and out of contact with the upper surface of a web product being carried through the apparatus, the major length of said elongated heating member extending in the direction of movement of said web product, and a second heating member supported on said frame for movement into and out of contact with the upper surface of said web product being carried through the apparatus at a point immediately forwardly of, and in line with, the surface area contacted by said elongated heating member, whereby the same surface area of said web product may be contacted first by said elongated heating member and immediately following by said second heating member as said web product is carried through the apparatus by said supporting and carrying means, said heating member extending in the direction of movement of said web product for a distance substantially less than the major length of said elongated heating member.

2. Apparatus for heat sealing thermoplastic webs comprising a frame, means on said frame for supporting and carrying thermoplastic web products through the apparatus, an elongated heating member supported on said frame for movement into and out of contact with the upper surface of a web product being carried through the apparatus, the major length of said elongated heating member extending in the direction of movement of said web product, a shorter heating member supported on said frame for movement into and out of contact with the upper surface of said web product being carried through the apparatus at a point immediately forwardly of, and in line with, the surface area contacted by said elongated heating member, whereby the same surface area of said web product may be contacted first by said elongated heating member and immediately following by said shorter heating member as said web product is carried through the apparatus by said supporting and carrying means, and a shiftable control rod connected through linkage means to each of said heating members for simultaneously raising and lowering said heating members.

3. Apparatus for heat sealing thermoplastic webs comprising a frame, means on said frame for supporting and carrying the thermoplastic web products through the apparatus, an elongated heating member supported on said frame for movement into and out of contact with the upper surface of a web product being carried through the apparatus, the major length of said elongated heating member extending in the direction of movement of said web product, second heating member supported on said frame for movement into and out of contact with the upper surface of said web product being carried through the apparatus at a point immediately forwardly of, and in line with, the surface area contacted by said elongated heating member, whereby the same surface area of said web product may be contacted first by said elongated heating member and immediately following by said second heating member as said web product is carried through the apparatus by said supporting and carrying means, said second heating member extending in the direction of movement of said web product for a distance substantially less than the major length of said elongated heating member, a shiftable control rod connected through linkage means to each of said heating members for simultaneously raising and lowering said heating members, and adjustable means independent of said control rod which engages said linkage means for controlling the lowermost position of said second heating member to thereby regulate the pressure with which said second heating member contacts said web product.

4. Apparatus for heat sealing thermoplastic webs comprising a frame, means on said frame for supporting and carrying thermoplastic web products horizontally through the apparatus, an elongated heating member supported on said frame for movement into and out of contact with the upper surface of a web product being carried through the apparatus, the major length of said elongated heating member extending in the direction of movement of said web product, a second heating member supported on said frame for movement into and out of contact with the upper surface of said web product being carried through the apparatus at a point immediately forwardly of, and in line with, the surface area contacted by said elongated heating member, whereby the same surface area of said web product may be contacted first by said elongated heating member and immediately following by said second heating member as said web product is carried through the apparatus by said supporting and carrying means, said second heating member extending in the direction of movement of said web product for a distance substantially less than the major length of said elongated heating member, a longitudinally shiftable control rod connected through linkage means to each of said heating members for simultaneously raising and lowering said heating members, and means on said frame movable into engagement with said linkage means for locking said heating members in raised position.

5. Apparatus for heat sealing thermoplastic webs comprising a frame, a pair of cooperating, horizontally disposed feed belts for supporting and carrying thermoplastic web products horizontally and longitudinally through the apparatus, said cooperating feed belts constituting the upper reach of a lower endless conveyor belt and the lower reach of an upper endless conveyor belt, said belts being disposed about a plurality of transversely extending, horizontally spaced rollers supported on said frame, at least one elongated, longitudinally extending heating member supported on said frame for movement into and out of contact with the upper surface of a web product being carried through the apparatus, and a second, heating member being positioned forwardly of each of said elongated heating members, said second heating members being supported on said frame for movement into and out of contact with the upper surface of said web product being carried through the apparatus at points immediately forwardly of, and in line with, the surface areas contacted by said elongated heating members, whereby the same surface areas of said web product may be contacted first by an elongated heating member and immediately following by a second heating member as said web product is carried through the apparatus by said feed belts, said second heating members extending in the direction of movement of said web product for a distance substantially less than the major length of said elongated heating members.

6. Apparatus for heat sealing thermoplastic webs comprising a frame, a pair of cooperating, horizontally disposed feed belts for supporting and carrying thermoplastic web products horizontally and longitudinally through the apparatus, said cooperating feed belts constituting the upper reach of a lower endless conveyor belt and the lower reach of an upper endless conveyor belt, said belts being disposed about a plurality of transversely extending, horizontally spaced rollers supported on said frame, at least one elongated, longitudinally extending heating member supported on said frame for movement into and out of contact with the upper surface of a web product being carried through the apparatus, a second, heating member being positioned forwardly of each of said elongated heating members, said second heating members being supported on said frame for movement into and out of contact with the upper surface of said web product being carried through the apparatus at points immediately forwardly of, and in line wtih, the surface areas contacted by said elongated heating members, whereby the same surface areas of said web product may be contacted first by an elongated heating member and immediately following by a second heating member as said web product is carried through the apparatus by said feed belts, said second heating members extending in the direction of movement of said web product for a distance substantially less than the major length of said elongated heating members, a longitudinally shiftable control rod connected through linkage means to each of said heating members for simultaneously raising and lowering said heating members, means on said frame movable into engagement with said linkage means for locking said heating members in raised position, adjustable means independent of said control rod which engage said linkage means for controlling the lowermost position of said second heating members to thereby regulate the pressure with which said second heating members contact said web product, and said second heating members being resiliently based so as to follow the surface contour of said web product being carried through the apparatus as said web product moves past said second heating members.

7. Apparatus for heat sealing thermoplastic webs comprising a frame, means on said frame for supporting and carrying thermoplastic web products horizontally and longitudinally through the apparatus, an elongated, longitudinally extending ski-shaped plate of conductive material supported on said frame for movement into and out of contact with the upper surface of a web product being carried through the apparatus, a rectangular block of conductive material supported on said frame for movement into and out of contact with the upper surface of said web product being carried through the apparatus at a point immediately forwardly of, and in line with, the surface area contacted by said elongated ski-shaped plate whereby the same surface area of said web product may be contacted first by said elongated, ski-shaped plate and immediately following by said rectangular block, said rectangular block extending in the direction of movement of said web product for a distance substantially less than the major length of said ski-shaped plate, and means connected with said plate and said rectangular block for independently heating said plate and said rectangular block to predetermined temperatures.

8. Apparatus for heat sealing thermoplastic webs comprising a frame, means on said frame for supporting and carrying thermoplastic web products horizontally and longitudinally through the apparatus, at least one elongated, longitudinally extending ski-shaped plate of conductive material supported on said frame for movement into and out of contact with the upper surface of a web product being carried through the apparatus, a rectangular block of conductive material positioned forwardly of each of said ski-shaped plates, said rectangular blocks being supported on said frame for movement into and out of contact with the upper surface of said web product being carried through the apparatus at points immediately forwardly of, and in line with, the surface areas contacted by said ski-shaped plates, whereby the same surface areas of said web product may be contacted first by an elongated ski-shaped plate and immediately following by a short rectangular block, said rectangular blocks extending in the direction of movement of said web product for a distance substantially less than the longitudinal extension of said ski-shaped plates, means connected with each of said plates and rectangular blocks for independently heating each of said plates and rectangular blocks to predetermined temperatures, a longitudinally shiftable control rod connected through linkage means to each of said plates and rectangular blocks for simultaneously raising and lowering said plates and rectangular blocks, and means on said frame movable into engagement with said linkage means for locking said plates and rectangular blocks in raised position.

9. Apparatus for heat sealing thermoplastic webs comprising a frame, means on said frame for supporting and carrying thermoplastic web products horizontally and longitudinally through the apparatus, at least one elongated, longitudinally extending ski-shaped plate of conductive material supported on said frame for movement into and out of contact with the upper surface of a web product being carried through the apparatus, a rectangular block of conductive material positioned forwardly of each of said ski-shaped plates, said rectangular blocks being supported on said frame for movement into and out of contact with the upper surface of said web product being carried through the apparatus at points immediately forwardly of, and in line with, the surface areas contacted by said ski-shaped plates, whereby the same surface areas of said web product may be contacted first by an elongated ski-shaped plate and immediately following by a rectangular block, said rectangular blocks extending in the direction of movement of said web product for a distance substantially less than the longitudinal extension of said ski-shaped plates, means for rotating said rectangular blocks about transverse axes for adjusting the angles of contact between the lower faces of said rectangular blocks and the upper surface of said web product being carried through the apparatus, means biasing said rectangular blocks in a generally downward direction towards the upper surface of said web product being carried through the apparatus, means connected with each of said plates and rectangular blocks for independently heating each of said plates and rectangular blocks to predetermined temperatures, a longitudinally shiftable control rod connected through linkage means to each of said plates and rectangular blocks for simultaneously raising and lowering said plates and rectangular blocks, and means on said frame movable into engagement with said linkage means for locking said plates and said rectangular blocks in raised position.

10. Apparatus for heat sealing thermoplastic webs comprising a frame, means on said frame for supporting and carrying thermoplastic web products horizontally and longitudinally through the apparatus, at least one elongated longitudinally extending ski-shaped plate of conductive material supported on said frame for movement into and out of contact with the upper surface of a web product being carried through the apparatus, a rectangular block of conductive material positioned forwardly of each of said ski-shaped plates, said rectangular blocks being supported on said frame for movement into and out of contact with the upper surface of said web product being carried through the apparatus at points immediately forwardly of, and in line with, the surface areas contacted by said ski-shaped plates, whereby the same surface areas of said web product may be contacted first by an elongated ski-shaped plate and immediately following by a rectangular block, said rectangular blocks extending in the direction of movement of said web product for a distance substantially less than the longitudinal extension of said ski-shaped plates, means for rotating said rectangular blocks about transverse axes for adjusting the angles of contact between the lower faces of said rectangular blocks and the upper surface of said web product being carried through the apparatus, means biasing said rectangular blocks in a generally downward direction towards the upper surface of said web product being carried through the apparatus, means connected with each of said plates and rectangular blocks for independently heating each of said plates and rectangular blocks to predetermined temperatures, a longitudinally shiftable control rod connected through linkage means to said plates and rectangular blocks for simultaneously raising and lowering said plates and said rectangular blocks, means on said frame movable into engagement with said linkage means for locking said plates and rectangular blocks in raised position, adjustable means independent of said control rod which engage said linkage means for controlling the lowermost position of said rectangular blocks to thereby regulate the pressures with which said rectangular blocks contact said web product being carried through the apparatus, and means for adjusting the transverse positions of said plates and rectangular blocks on said apparatus for changing the location of the surface areas contacted by said plates and rectangular blocks.

11. Apparatus for heat sealing thermoplastic webs comprising a frame, a pair of cooperating, horizontally disposed feed belts for supporting and carrying thermoplastic web products horizontally and longitudinally through the apparatus, said cooperating feed belts constituting the upper reach of a lower endless conveyor belt and the lower reach of an upper endless conveyor belt, said belts being disposed about a plurality of transversely extending, horizontally spaced rollers supported on said frame, at least one elongated, longitudinally extending ski-shaped plate of conductive material supported on said frame for movement into and out of contact with the upper surface of a web product being carried through the apparatus, a rectangular block of conductive material positioned forwardly of each of said ski-shaped plates, said rectangular blocks being supported on said frame for movement into and out of contact with the upper surface of said web product being carried through the apparatus at points immediately forwardly of, and in line with, the surface areas contacted by said ski-shaped plates, whereby the same surface areas of said web product may be contacted first by an elongated ski-shaped plate and immediately following by a rectangular block, said rectangular blocks extending in the direction of movement of said web product for a distance substantially less than the longitudinal extension of said ski-shaped plates, means for rotating said rectangular blocks about transverse axes for adjusting the angles of contact between the lower faces of said rectangular blocks and the upper surface of said web product being carried through the apparatus, means biasing said rectangular blocks in a generally downward direction towards the upper surface of said web product being carried through the apparatus, means connected with each of said plates and rectangular blocks for independently heating each of said plates and rectangular blocks to predetermined temperatures, a longitudinally shiftable control rod connected through linkage means to said plates and rectangular blocks for simultaneously raising and lowering said plates and said rectangular blocks, means on said frame movable into engagement with said linkage means for locking said plates and rectangular blocks in raised position, adjustable means independent of said control rod which engage said linkage means for controlling the lowermost position of said rectangular blocks to thereby regulate the pressures with which said rectangular blocks contact said web product being carried through the apparatus, and means for adjusting the transverse positions of said plates and rectangular blocks on said apparatus for changing the location of the surface areas contacted by said plates and rectangular blocks.

12. Apparatus for heat sealing thermoplastic webs comprising a frame, a pair of cooperating, horizontally disposed feed belts for supporting and carrying thermoplastic web products horizontally and longitudinally through the apparatus, said cooperating feed belts constituting the upper reach of a lower endless conveyor belt and the lower reach of an upper endless conveyor belt, said belts being disposed about a plurality of transversely extending, horizontally spaced rollers supported on said frame, at least one elongated, longitudinally extending ski-shaped plate of conductive material supported on said frame for movement into and out of contact with the upper surface of a web product being carried through the apparatus, a rectangular block of conductive material positioned forwardly of each of said ski-shaped plates, said rectangular blocks being supported on said frame for movement into and out of contact with the upper surface of said web product being carried through the apparatus at points immediately forwardly of, and in line with, the surface areas contacted by said ski-shaped plates, whereby the same surface areas of said web product may be contacted first by an elongated ski-shaped plate and immediately following by a rectangular block, said rectangular blocks extending in the direction of movement of said web product for a distance substantially less than the longitudinal extension of said ski-shaped plates, means for rotating said rectangular blocks about transverse axes for adjusting the angles of contact between the lower faces of said rectangular blocks and the upper surface of said web product being carried through the apparatus, means biasing said rectangular blocks in a generally downward direction towards the upper surface of said web product being carried through the apparatus, means connected with each of said plates and rectangular blocks for independently heating each of said plates and rectangular blocks to predetermined temperatures, a longitudinally shiftable control rod connected through linkage means to said plates and rectangular blocks for simultaneously raising and lowering said plates and said rectangular blocks, means on said frame movable into engagement with said linkage means for locking said plates and rectangular blocks in raised position, adjustable means independent of said control rod which engage said linkage means for controlling the lowermost position of said rectangular blocks to thereby regulate the pressures with which said rectangular blocks contact said web product being carried through the apparatus, means for adjusting the transverse positions of said plates and rectangular blocks on said apparatus for changing the location of the surface areas contacted by said plates and rectangular blocks, and said plates and rectangular blocks being movable in a vertical direction when they are in lowered position so as to follow the surface contour of said web product being carried through the apparatus.

References Cited in the file of this patent

UNITED STATES PATENTS 2,469,972    Lowry et al.    May 10, 1949